Feb. 9, 1926.

M. J. WEBER

WEIGHING SCALE

Filed March 26, 1920

WITNESS:
E. N. Hanson

INVENTOR
Mathias J. Weber
BY Murray L. & Wilson
ATTORNEYS.

Feb. 9, 1926.
M. J. WEBER
WEIGHING SCALE
Filed March 26, 1920   2 Sheets—Sheet 2
1,572,627
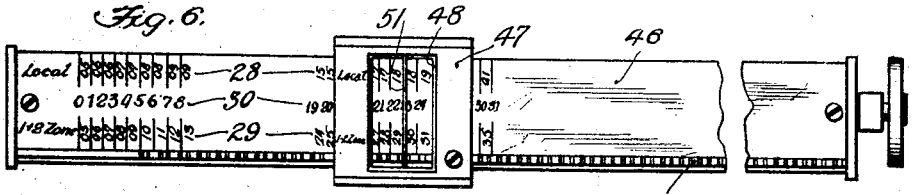
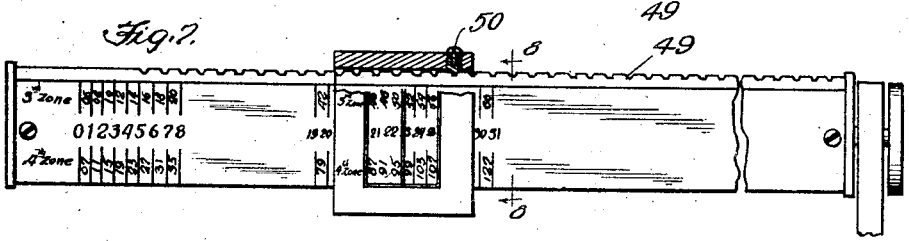
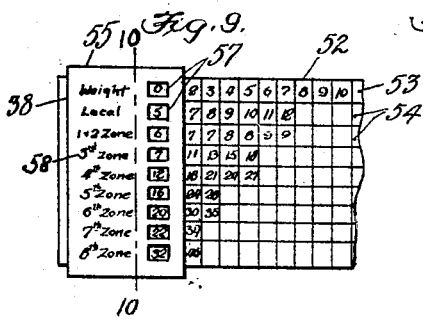
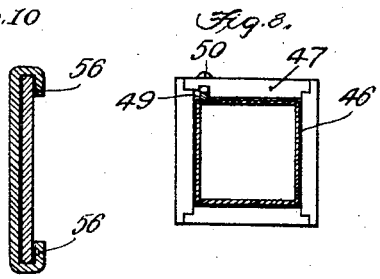
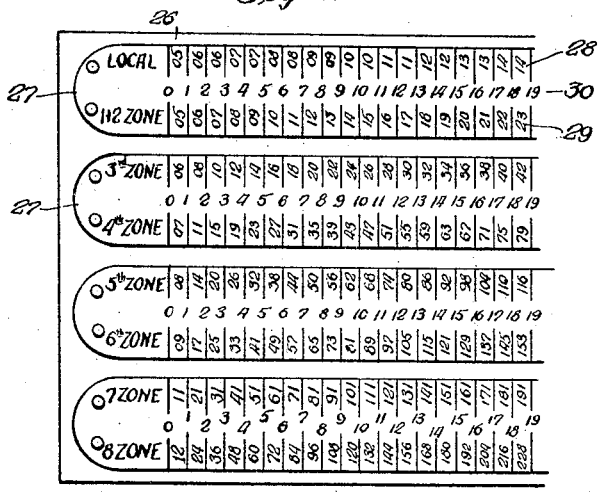

Patented Feb. 9, 1926.

1,572,627

UNITED STATES PATENT OFFICE.

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

WEIGHING SCALE.

Application filed March 26, 1920. Serial No. 368,892.

*To all whom it may concern:*

Be it known that I, MATHIAS J. WEBER, a citizen of the United States, and a resident of Chicago, in the county of Cook and State of Illinois, have invented certain new and useful Improvements in Weighing Scales, of which the following is a specification.

My invention relates to an improvement in weighing scales and has special reference to a parcel post scale which will automatically indicate or designate the cost for transmitting parcels to the several zones.

A particular object of my invention is to provide a weighing scale or scale beam in which the adjustable weight is also the indicator, the beam being provided not only with designations of the weight, but also with designations of the cost for each parcel post zone of a package of the weight designated by the adjustable weight when moved to a position to balance the package, the transmission cost of which is desired.

A further object of my invention is to provide a combined parcel post scale adapted to designate the transmission cost to the various zones of articles weighed by the scale, with an ordinary scale or scale beam for use in the ordinary weighing of parcels.

One essential feature of my invention is a beam or indicator which carries the cost designations of the several zones for each graduation of weight, within the capacity of the scale. As there are eight zones and the cost of transmission of a given weight of parcel to the several zones varies, it is necessary to provide at least eight lines of figures, and as these figures must be easily legible, the transverse width of a beam to carry these several rows of figures is necessarily considerable.

My improved indicating beam may take several forms—either wide and flat, having the eight rows of figures for the eight zones showing upon one side of the beam or a square beam having the rows for two zones arranged on each flat side of the beam, or a cylindrical beam, the several rows arranged in longitudinal lines on the cylinder and the cylinder being rotatable to bring the desired row or zone figures into view in relation to the indicator.

In all forms the indicator forms the adjustable weight on the beam so that when this weight is adjusted to balance the package the cost can be immediately read off for the zone desired.

My invention will be more readily understood by reference to the accompanying drawings forming part of this specification and in which:

Figures 6 and 7 are views similar to Figures 1 and 2 showing a form of my invention in which the cost indicating member also forms a guide for the scale weight;

Figure 8 is a detail vertical section on the line 8—8 of Fgure 7;

Figure 9 is a fragmentary elevation of another form of combined indicator and scale beam;

Figure 10 is a vertical section on the line 10—10 of Figure 9; and

Figure 11 is a fragmentary elevation of the designation sheet which I use upon the cylinder shown in Figures 1 to 5 inclusive.

Figure 1:
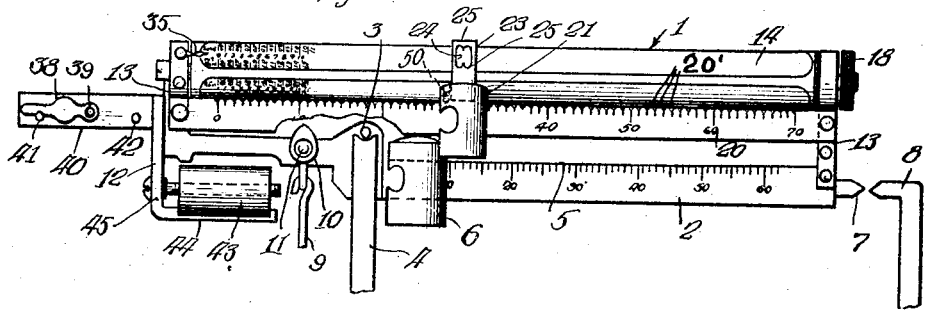
Figure 1 is a fragmentary elevation of my improved indicator scale beam for a platform scale, the platform and connections not being shown.
Figure 2:
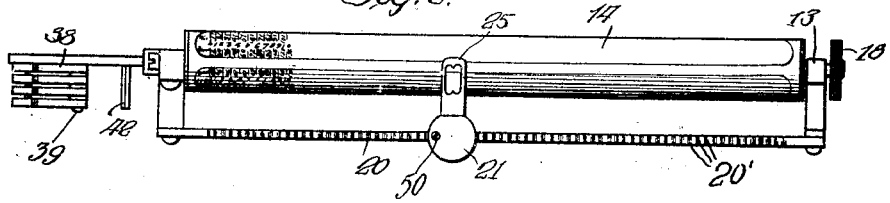
Figure 2 is a fragmentary top plan view of the beam shown in Figure 1.
Figures 3, 5:
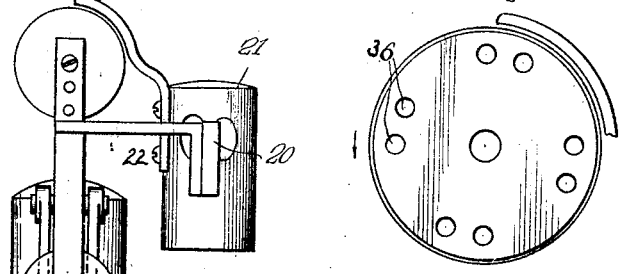
Figure 3 is an end elevation of the beam shown in Figure 1.
Figure 5 is a detail vertical section on the line 5—5 of Figure 4.
Figure 4:
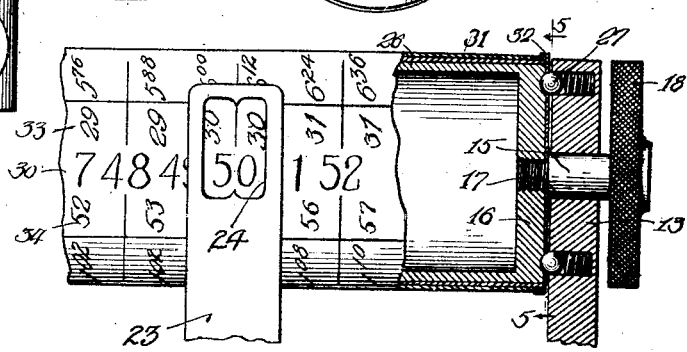
Figure 4 is a fragmentary enlarged side elevation of the outer end of the beam, shown partly in section, and particularly illustrating the means provided for holding the rotatable cylinder in proper designation position.

Referring now particularly to the form of my invention illustrated in Figures 1 to 5 inclusive, I designate generally a scale beam for a platform scale.

This beam consists of a weight indicator bar 2 of usual form having knife edge supports 3 adapted to support the beam upon the post 4 of the scale. This bar has weight designations 5 and a sliding weight 6 for use in weighing articles when the postage cost is not desired. The outer end of the beam is provided with an indicating point 7 and a fixed cooperating indicating point 8 is provided to show when the scale is in balanced condition.

At the rear of the support 3 the beam is connected by a rod 9 to the platform mechanism for transmitting the weight to the beam. This rod is connected to the beam in the usual manner by a U-shaped strap 10 and knife edge contacts 11.

The rear end of the bar 2 carries a bracket member 12 which projects rearwardly and upwardly and the forward end of the bar 2 bears a similar bracket member 13. In the free ends of these bracket members I rotatably mount a cylindrical indicator member 14 which extends from bracket to bracket. I provide a supporting trunnion 15 secured rigidly in each end wall 16 of the cylinder and fitting within horizontal bores 17 in the brackets 12 and 13. At the outer end of the cylinder the trunnion is provided on its outer end with a hand wheel 18 by which the cylinder can be readily rotated on its bearings.

The brackets 12 and 13 also carry a weight designation bar 20 which is parallel with the weight bar 2 and is provided with a sliding weight 21 for balancing the scale in the act of weighing an article. Attached to this sliding weight 21 is an indicator member 22 which extends upwardly and rearwardly and has its upper end 23 curved to conform with the cylindrical surface of the cylinder 14. This indicating member 23 is provided with an opening 24 through which the surface of the cylinder can be seen, and the upper and lower walls of this opening are provided with centering indicating points 25 for accurately indicating upon the scale carried on the cylinder 14 the cost of transmission of the article being weighed.

For providing the cost designations I preferably provide a printed sheet 26, Figure 11, having several series of cost designations extending longitudinally thereon. Each of these series consists of two lines or rows of figures 28 and 29, which designate the cost of transmission for a particular zone, as for instance, rows 28 and 29 of the upper set in Figure 11 designate respectively the cost for the local zone and the first and second zones respectively, and the other sets of figures designate the costs for the other zones, each set indicating the cost for two zones, as for instance, three and four, five and six, and seven and eight.

Between the rows of the cost designations 28 and 29 in each instance is a third row of figures or scale 30 which designates the corresponding weight, as for instance, one, two, three, etc.

The sheet 26 is as long as the cylinder 14 and is preferably covered by a sheet of transparent celluloid 31, or the like, for keeping the scale sheet 26 clean. The sheet of celluloid may be held in place upon the cylinder 14 by having its ends secured under the flanges 32 at the ends of the cylinder, or in any other suitable manner.

The window or opening 24 in the indicator 23 is long enough, circumferentially of the cylinder, to expose the center row of figures and the cost designation of one of the contiguous rows of figures. For instance, if the row of figures 30 in Figure 4 designates weight, then the row of figures 33 might designate the cost of postage for the local zone and the row 34 the cost of transportation to the first and second zone. In said Figure 4 the indicator is set to show the cost in the local zone for 50 lbs. For setting the cylinder to show in the opening 24 the cost of the proper zone I arrange an indicator pointer 35 at the rear or left hand end of the cylinder 14 carried on the adjacent bracket 12 and projecting over the cylinder in the right position to indicate where the cylinder is to be positioned to show the desired zone through the window, the adjacent end of the sheet 26 having thereon the words "Local," "1 & 2 zone," "3rd zone," etc., in line with the several rows of figures respectively.

As the cost for one zone appears slightly above the weight figure in the sight opening 24 and the cost for the associated zone appears below the weight figure they occupy positions which are not exactly the same, but the indicator pointer 35 which is set to point to the vertical center of the sight opening 24 always point most nearly to the row of cost figures which is desired to have appear in the sight opening 24.

To definitely place the cylinder when rotated by means of the hand wheel 18 for showing in the sight opening 24 the cost desired, I provide hemispherical depressions 36 in the end wall of the cylinder and I provide a spring pressed ball 37 in the bracket 13 adapted to enter the several depressions as the cylinder is rotated. The depressions 36 and the relative position of the ball 37 are such that the ball enters the corresponding depression when the cylinder is rotated to bring one of the cost designation rows of figures into view through the window 24, at which time the indicator 35 points to the proper word designation at the end of the cylinder 14.

As the cost of transportation by parcel post is the same for all zones up to four ounces, varying by one ounce increments, I arrange a very simple means of weighing articles of four ounces or less weight and indicating the cost of transporting same for all zones.

This means consists of four small weights 38 mounted to swing at one end on a pin 39 carried by a horizontal bar 40 extending rearwardly from the rear end of the beam 1. These weights are supported in horizontal positions by support pins 41 and 42 and are adapted to be swung over from extending to the rear, as shown in Figure 1 in full lines 1, to extend forwardly as shown in dotted lines. The change of one of these weights from a rearwardly extending position to a forwardly extending position is equal to or balances an article being weighed which weighs one ounce or less, and each of these weights carries upon its face the designation of the corresponding cost of transportation, increasing from the outermost weight to the weight next to the bar 40.

For accurately counterbalancing the scale so that it will weigh accurately I provide a movable counterbalance weight 43 carried on the bracket 44 attached to the lower end of the bracket 12 and engaging a free arm 45 of the bracket 44 to prevent the rotation of the weight. The weight is moved longitudinally relatively to the scale beam by means of a screw 45 which is shouldered in the bracket 44 and held against longitudinal movement thereby. The screw is threaded into the weight and when the screw is rotated the weight is caused to move from or toward the support of the scale beam. The screw has a screw-driver slot in its head and in order to adjust the scale it is necessary to use a screw-driver.

As so far described the bar upon which the weight 21 slides is separate from the cost designation element but it will be obvious that this is not a necessity and I have illustrated two forms of my invention, in which the adjustable element, or weight determining element slides upon the cost designating element itself.

In Figures 6 to 8 inclusive I have shown a cost designation element 46 which in this instance is square in cross-section, as best shown in Figure 8. This element is adapted to be mounted similar to the mounting of the cylinder 14, that is, to rotate on a horizontal axis, and its four flat sides are provided with rows of figures showing cost and weight designation similar to the rows 28, 29 and 30 on the cylinder 14.

I provide a balance weight 47 slidable longitudinally on the square bar 46 and having side openings 48, one on each side thereof, to expose the rows of cost and weight designations and I provide a longitudinal bar or rack 49 on the bar 46, and an adjustable pin 50 carried by the weight 47 for entering the notches to definitely place the weight at points indicating whole pounds or divisions of a pound as desired and in accordance with the usual practice. The weight 47 is made in pieces and secured around the square bar 46 and is adapted to slide freely longitudinally thereon. In each side opening I provide a centrally arranged indicating wire 51 extending transversely of the bar 46 and adapted to indicate the weight of the article being weighed and as the cost figures are arranged above and below the weight figures, the cost figures are also indicated by the wire 51.

I preferably arrange on the side faces of the weight 47 words showing what the figures on the adjacent side of the bar designate, as for instance, third zone, fourth zone, et cetera, as shown in Figure 7.

In the form of my invention illustrated in Figures 1 to 5 inclusive I also provide notches 20′ in the upper edge of the weight bar 20 for setting the weight 21 accurately on the unit weight points, in this instance one pound, and I provide the weight 21 with one of the pins 50 similar to that shown in Figure 6 for entering the notches and setting the weight accurately.

In Figures 9 and 10 I have shown another form of cost designation bar and adjustable weight. In this form the bar 52 is wide vertically and carries upon one face several rows of figures, 53, 54. The upper row 53 designates weight in pounds and the several rows 54 designate the cost of transportation to the several zones beginning at the top with the local zone and continuing downwardly in succession with the first and second zone, third zone, fourth zone, et cetera.

I arrange a weight 55 to slide longitudinally on the bar 52 and held on said bar by having its ends 56 bent around the edges of the bar. Preferably, I provide the weight with a vertical row of sight openings 57 through which the figures in the several rows 53, 54 may be seen. This weight also carries words 58 designating the significance of the several rows of figures.

In using the form of my improved scale shown in Figures 6 to 8 inclusive it is merely necessary to slide the weight 47 along the bar 46 until the scale is in balanced condition then by rotating the bar 46 the figures for the desired zone can be brought into view.

In the form of my invention shown in Figures 9 and 10 it is merely necessary to move the weight 55 along the bar 52 until the scale is in balanced condition when the cost of transportation to the desired zone can be read off directly through one of the windows or sight openings 57.

It will be obvious that many modifications of my invention will readily suggest themselves to one skilled in the art, without departing from the spirit of my invention and I therefore do not limit or confine my invention to the specific structures herein shown and described.

I claim:

1. The improvements herein described, comprising a weighing scale provided with a beam, a movable weight on the beam, a postal transmission cost element associated with the weight and bearing both weight and postal rate zone indications, and an indicator on the weight for designating on the cost element the transmission cost for each unit of weight indication substantially as described and means limiting the visual designations to a single postal zone rate indication.

2. The improvements herein described comprising a scale beam, a weight longitudinally movable on the beam for balancing an article being weighed, a postal cost designation element having rows of figures showing both units of weight and the cost of transmission of articles to the several postal zones, means for indicating the corresponding cost figures for each unit of weight indication, substantially as described and means limiting the designations to a selected zone.

3. The improvements herein described comprising a beam for a weighing scale having a postal transmission cost designation and weight indicating element, a weighing element adjustable longitudinally in relation to the cost designation element, the cost designation element having a designation line of figures for each parcel-post zone, and means carried by the adjustable weight for indicating on the designation element the cost price for each zone corresponding to the weight of the article being weighed, means for selecting a zone and means for limiting the designations to the selected zone.

4. In a parcel post scale, a scale beam having a longitudinally sliding weight for balancing an article being weighed, in combination with a cost designation scale carrying figures designating both units of weight and the transmission cost to the several zones for each unit of weight, and means for bringing the several lines of figures into relation to the weight for accurately designating the cost of transmission to the several zones, substantially as described and means limiting the designations to a selected zone.

5. In a parcel post scale, a scale beam having a weight longitudinally movable thereon for balancing a parcel being weighed, a cylindrical transmission cost designation element associated with the movable weight having rows of figures for respective zones showing both units of weight and transmission cost therefor, means carried by the weight for indicating the respective cost on the scale, the rotation of the cylindrical element bringing the figures for the several zones into indicating relation to the weight, and means preventing any but one cost being seen at one time, substantially as described.

6. In a parcel post scale, a scale beam having a weight longitudinally movable thereon for balancing a parcel being weighed, a cylindrical cost designation element carried by the beam, said cylinder being provided with a line of figures designating both units of weight and the cost of transmission to each zone, the cost for each unit of weight being in transverse alignment with a position of the movable weight for respective loads, an indicator on the weight, the designation cylinder being rotatable to bring the several lines of figures, one at a time, into register with the indicator, and means preventing any but one cost being seen at one time, substantially as described.

7. In a parcel post scale, a scale beam, an adjustable weight longitudinally movable on the beam for indicating the weight of a parcel being weighed, a cylindrical cost designation element having several pairs of lines of figures designating respectively the cost of transmission for adjacent zones, the cylindrical element having a line of figures between the lines of cost designating figures designating corresponding weights, an indicator carried by the adjustable weight, the indicator having a sight opening through which the weight figures and one line of cost figures can be viewed, and means for rotating the cylinder to bring the lines of figures for the several zones successively into view, substantially as described.

8. A parcel post scale, a scale having a scale beam, a weight movable longitudinally thereon to balance an article being weighed, a cost designation cylinder carried by the beam, a cylinder provided with a row of figures designating the cost of transmission to each zone, an indicator carried by a movable weight having a sight opening through which but one of the rows of figures indicating the transportation cost can be seen at a time, means for rotating the cylinder to bring the several lines into view one at a time, means for yieldingly holding the cylinder in proper indicating position, and a stationary indicator at one end of the cylinder for indicating the desired row to be placed in view, substantially as described.

9. In a parcel post scale, a cost designation beam for indicating the transmission cost to the several zones for articles weighing one pound or more by units of one pound, and an auxiliary balancing device for four ounces varying by single ounces for designating the transmission cost for articles weighing four ounces or less said balancing device comprising a plurality of pivoted weights, substantially as described.

10. In a parcel post scale, a scale beam having weight designations thereon, a counterpoise movable thereon for balancing an article being weighed, an independent cost designation element having also weight designations thereon corresponding to the cost designations, an indicator carried by the counterpoise and related to the cost designation element to show the cost for each zone corresponding to each unit of weight, substantially as described.

11. In a parcel post scale, a scale beam, an adjustable weight longitudinally movable on the beam for indicating the weight of a parcel being weighed, a combined weight and cost designation element indicating costs for a given weight for a plurality of parcel post zones, and means for arranging said element to bring into view figures indicating the weight of the parcel and the cost for said weight to a particular selected zone only.

12. In a parcel post scale, a scale beam, an adjustable weight longitudinally movable on the beam for indicating the weight of a parcel being weighed, a combined weight and cost designation element indicating costs for a given weight for a plurality of parcel post zones, means for arranging said element to bring into view figures indicating the weight of the parcel and the cost for said weight to a particular selected zone only, and resilient means for holding said element in selected position.

13. In a parcel post scale, a cost designation beam for indicating weight units and transmission cost to different zones for each unit, and an auxiliary balancing device for weighing articles of four ounces, or less, said device comprising a plurality of pivoted weights on said beam, each weight bearing indications of cost of transmission to all zones of the article weight represented thereby.

14. In a parcel post scale, the combination of a scale beam, a weight movable longitudinally thereon, a parcel post weight and cost designation element separate from the beam and arrangeable to either of a plurality of parcel post zones, and means carried by the weight for indicating the associated weight designation on said element and the cost of sending packages of such weight to a selected parcel post zone.

15. In a parcel post scale, the combination of a scale beam, a weight movable longitudinally thereon, a parcel post weight and cost designation element arrangeable to either of a plurality of parcel post zones, means carried by the weight for indicating the associated weight designation on said element and the cost of sending packages of such weight to a selected parcel post zone, and a separate weight beam for use in the ordinary weighing of parcels.

Signed at Chicago, Illinois, this 12th day of March, 1920.

MATHIAS J. WEBER.